United States Patent [19]
True et al.

[11] Patent Number: 6,013,697
[45] Date of Patent: *Jan. 11, 2000

[54] TIRE SEALANT COMPOSITION

[75] Inventors: Glen C. True; Terry J. Glaser, both of Longmont, Colo.

[73] Assignee: Glaser-True Bike Route, Ltd., Longmont, Colo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/756,957

[22] Filed: Dec. 3, 1996

Related U.S. Application Data

[63] Continuation of application No. 08/756,957, Dec. 3, 1996, which is a continuation of application No. 08/551,228, Oct. 31, 1995, abandoned, which is a continuation of application No. 08/304,449, Sep. 12, 1994, abandoned.

[51] Int. Cl.⁷ .................................................. B29C 73/02
[52] U.S. Cl. ........................... 523/166; 106/33; 106/415; 106/416; 106/417; 252/964; 152/504
[58] Field of Search ............................... 523/166; 106/33, 106/415, 416, 417; 252/964; 152/504

[56] References Cited

U.S. PATENT DOCUMENTS

| | | | |
|---|---|---|---|
| 3,747,660 | 7/1973 | Tibbals | 152/504 |
| 4,051,884 | 10/1977 | Bourne et al. | 152/509 |
| 4,101,494 | 7/1978 | Kent et al. | 523/166 |
| 4,113,799 | 9/1978 | Van Ornum et al. | 525/99 |
| 4,116,895 | 9/1978 | Kageyama et al. | 524/574 |
| 4,424,295 | 1/1984 | Van Ornum et al. | 524/526 |
| 4,588,758 | 5/1986 | Jaspon | 523/166 |
| 4,607,065 | 8/1986 | Kitamura et al. | 522/83 |
| 5,364,463 | 11/1994 | Hull | 106/33 |
| 5,772,747 | 6/1998 | Turner et al. | 106/33 |

OTHER PUBLICATIONS

Material Safety Data Sheet, Access Marketing, effective Jan. 1, 1993, printed Mar. 8, 1994, pp. 1–2.

*Primary Examiner*—Terrel Morris
*Assistant Examiner*—John J. Guarriello
*Attorney, Agent, or Firm*—Duft, Graziano & Forest P.C.

[57] ABSTRACT

A tire sealant mixture contains water, mica flakes, hydrated bentonite clay, and a water-miscible carrying agent such as propylene glycol. This sealant mixture is capable of sealing a puncture caused by a 3mm diameter nail without significant pressure loss when the mixture is deployed inside the tire as a prophylactic measure against flat tires.

6 Claims, 1 Drawing Sheet

6,013,697

TIRE SEALANT COMPOSITION

RELATED APPLICATIONS

This application is a continuation of application Ser. No. 08/756,957 filed Dec. 3, 1996, which is a continuation of application Ser. No. 08/551,228 filed Oct. 31, 1995, which is a continuation of application Ser. No. 08/304,449 filed Sep. 12, 1994.

BACKGROUND OF THE INVENTION

1. Field of the Invention

The present invention pertains to materials that may be used to seal punctures in pneumatic tires, and, more particularly, to sealant compositions that contain a puncture filler material and a liquid carrier agent. Still more specifically, the invention pertains to low-viscosity sealant compositions that are introduced into inner tubes for rapidly sealing punctures as they occur, in order to prevent the occurrence of flat tires.

2. Statement of the Problem

Automotive tire sealant and/or ballasting compositions typically have a high apparent viscosity due to the need to resist escaping air and the need to provide a balanced uniform thickness of sealant on the tire wall where punctures occur. Kent et al, U.S. Pat. No. 4,101,494, teaches a ballasting composition having an apparent viscosity of from 1000 to 2200 centipoise at 100° F. This ballasting composition contains asbestos fibers and a polyvinyl alcohol, as well as an optional ethylene glycol antifreeze portion. Tibbals, U.S. Pat. No. 3,747,660, teaches a thixotropic tire ballasting composition that consists essentially of a gel-forming clay and an alkali metal hexametaphosphate. Kitamura et al, U.S. Pat. No. 4,607,065, teaches a sealant composition including butyl rubber, a tackifier, an acrylol or methacrylol group-containing a polymerization unsaturated compound, a filler, and a photopolymerization initiator. The filler may include glass fibers, clay, and silica. These high-viscosity compositions are useful in tubeless automotive tires, which operate at elevated temperatures resulting from high rpm and frictional contact with the pavement. A major problem exists with these compositions in that they contain ingredients which are potentially very hazardous to human health. Additionally, the butyl rubber-containing sealants are typically sprayed into a fixed position on the outer tire wall, but inner tubes cannot receive the sealants in this manner.

Prior tire sealant mixtures of the type that may be applied through a valve stem opening have traditionally been used only in Schrader-type valves, i.e., those having a spring-biased valve core that may be completely removed from the valve air inlet opening by unthreading the core from the threaded interior of the valve stem where it is seated. The Schrader valves are in widespread use on automobiles and probably a majority of bicycles. Even so, many bicycles have a European style Presta-type valve, which has a narrower valve stem interior than does the Schrader valve, and relies upon air pressure (not spring bias) for sealing. Tire sealant mixtures that include a viscous mixture of liquid and fibers typically clog Presta valves.

A commercially available viscous-fiber tire sealant composition, SLIME[1] from Access Marketing of Shell Beach, Calif., contains propylene glycol, man-made fibers, a corrosion inhibitor, and a biocide. These ingredients are typical of most commercially available fibrous bicycle tire sealants. This liquid composition is sold as a bicycle tire sealant, and is pumped into tires through a Schrader-type valve stem opening; however, the composition usually clogs the Presta-type valve cores and, as a practical matter, cannot be used to seal inner tubes having these types of valve cores. Furthermore, the mixture fails to seal many types of punctures in an instantaneous manner, and significant pressure drops are often observed after the puncture occurs. While the fibrous mixture has a lower apparent viscosity than do the automotive sealants and ballasting compositions that are discussed above, the apparent viscosity is still relatively high.

[1]. SLIME is a trademark of Access Marketing of Shell Beach Calif.

There remains a need for an environmentally compatible prophylactic sealant composition that is effective for sealing tire and inner tube punctures without significant pressure loss.

SOLUTION TO THE PROBLEM

The present invention overcomes the problems that are outlined above by providing an environmentally compatible tire sealant mixture that is very effective in sealing tire and inner tube punctures as they occur. The low viscosity mixture contains is rapidly deployed to puncture sites where it is needed and, consequently, a lesser volume and weight of the mixture is required for effective use.

Broadly speaking, the tire sealant mixture includes a hydrated clay, solid mineral flakes, water, and a water-miscible polyhydric alcohol. These ingredients are combined and stirred to substantial homogeneity, but may settle out of solution in the absence of agitation. In the proper relative proportions, these ingredients are effective for permitting a four ounce portion of the mixture to stop air flow through a tire puncture caused by a 3mm diameter nail after the nail is removed from the puncture. This stoppage is typically effective for retaining at least about 50 psi of internal pressure within the tire after sealing of the puncture.

The polyhydric alcohol is preferably a glycol having a carbon number ranging from two to seven, and is most preferably propylene glycol. Other glycols, such as ethylene glycol, may be used, but are less preferred due to corresponding increases in toxicity and/or viscosity. The mineral flakes are preferably mica flakes having an effective diameter up to about 1 millimeter ("mm"), and having an average effective particle diameter from about 0.01 to about 0.5 mm. The glycol is preferably present in a volume ranging from about 0.15 to about 0.4 gallons of glycol per gallon of the final mixture.

The hydrated clay is preferably formed from a dry bentonite powder, which most preferably has a majority sodium montmorillonite portion. The dry or desiccated clay is preferably provided in the form of a very finely divided powder, which may be obtained as a variety of commercially available drilling mud materials. These muds are designed to disperse individual clay platelets in a uniform manner throughout a fresh water aqueous system upon hydration of the muds, though, the mud system can typically tolerate some salts. The clay powder is hydrated by mixing it with water at ambient temperature and pressure prior to introducing the clay to the water-miscible polyhydric alcohol. The pre-hydration is preformed to avoid the deleterious effects upon viscosity and gel strength of direct mixing between the dry clay and the glycol or polyhydric alcohol. The weight of dry clay to the volume of the final sealant mixture will preferably range from about 0.2 to about 0.4 pounds of clay per gallon of the final mixture.

The final mixture will preferably contain hydrated clay in a minimal amount as needed to provide a gel strength sufficient to prevent any substantial settling of the mica in the mixture for an interval of approximately ten seconds immediately after agitation of the mixture ceases. This agitation, for example, may be caused by the rotation of a tire that contains the mixture in addition to compressed air. The amount of hydrated clay added to the mixture will also preferably provide an apparent viscosity of up to about 70 centipoise, more preferably up to about 50 centipoise, and most preferably about 30–40 centipoise, as determined at about 70° F. using a FANN-VG meter at 300 rpm.

The mineral flakes are preferably formed of mica, and are present in an amount ranging from about 0.5 to about 0.9 pounds of mica per gallon of the final mixture. The mica portion has a relatively larger particle size distribution than does the clay portion. This size distribution difference permits the mica to form a loose bridge over the puncture under the force of pressurized air attempting to escape. The hydrated bentonite completes the filter cake to completely seals the puncture by filling in the remaining voids. A small amount of fluid or sealant filtrate may be observed at the external puncture site after sealing, and represents a very small quantity of fluid that has been strained substantially free of bentonite and mica during the formation of a completely-sealing internal filter cake. The addition of polyhydric alcohol to the mixture serves to reduce the amount of fluid loss through the puncture, and also prevents the clay from completely drying at the site of the puncture.

DETAILED DESCRIPTION OF THE PREFERRED EMBODIMENT

Figure 1:
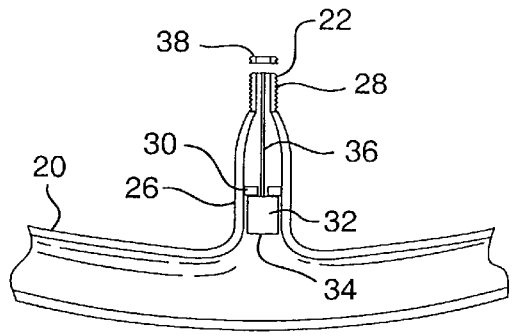
FIG. 1 depicts a side sectional view of a bicycle inner tube that is fitted with a Presta valve.
Figure 2:
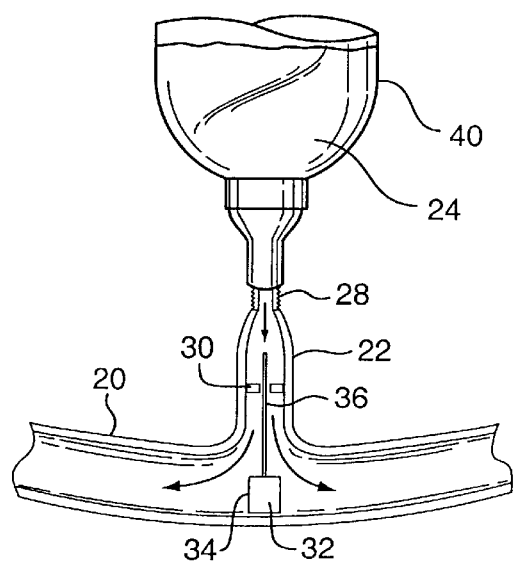
FIG. 2 depicts a bottle of tire sealant being positioned with the open bottle tip over the valve stem of FIG. 1 for introducing the tire sealant into the inner tube.
Figure 3:
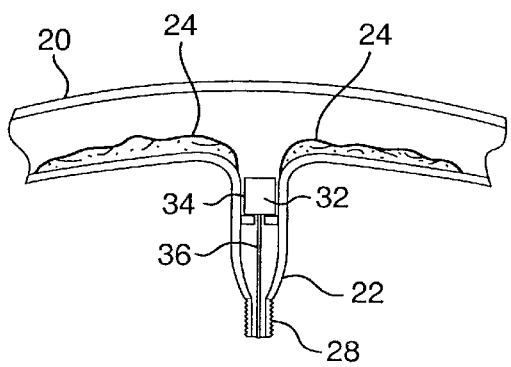
FIG. 3 depicts the inner tube of FIG. 1 in an inverted position for reinsertion of the core into the valve stem.

FIGS. 1–3 depict a bicycle inner tube 20 having a conventional Presta-type valve 22 as tube 20 is prepared to receive a tire sealant mixture 24 of the present invention. As is best depicted in FIG. 1, valve 22 includes a valve stem 26 having a threaded upper neck portion 28 and an interior core-seating portion 30. Valve stem 26 may optionally be provided with exterior threads and a nut to lock stem 26 in place through a stem-receiving hole in a conventional bicycle wheel rim (not depicted). Valve 22 also includes a valve core 32 having a stem-seating portion 34, a threaded rod 36, and a threaded cap 38. When tube 20 is filled with compressed air, the internal air forces stem-seating portion 34 into sealing engagement against core-seating portion 30, as assisted by tension in rod 36 derived from tightening cap 38.

Tube 20 is prepared for receiving sealant mixture 24 by cutting rod 36 at a position remote from stem-seating portion 34 and unscrewing cap 38 to drop core 32 into the position depicted in FIG. 2. As depicted in FIG. 2, bottle 40, which has a neck opening complementary to neck portion 28 for receipt thereover, is inserted over neck 28 and squeezed to force the sealant mixture 24 into tube 20. FIG. 3 depicts tube 20 being inverted to reinstall core 32 in a conventional manner after the addition of sealant mixture to the confines of tube 20. In contrast to prior fibrous filler materials, the present invention will not typically render valve 22 inoperable by clogging the area of seating elements 30 and 32.

The following non-limiting examples set forth preferred materials and methods for practicing the present invention.

EXAMPLE 1

THE PREFERRED SEALANT COMPOSITION FORMULATION

An approximate five gallon mixture of tire sealant was prepared by mixing the ingredients of Table 1.

TABLE 1

| Ingredient | Quantity |
|---|---|
| propylene glycol* | 1.5 gallons |
| water* | 1.5 gallons |
| dipotassium orthophosphate* | <0.8 pounds |
| hydrated bentonite gel | 2 gallons |
| mica | 3.5 pounds |

*Purchased together as AMBITROL[2] NTF 50 Coolant from Dow Chemical Company of Midland, Michigan

[2]. AMBITROL is a trademark of Dow Chemical Company of Midland, Mich.

The bentonite gel was prepared by mixing as a homogenous slurry 2.5 gallons of water with 2.25 pounds of dry, finely divided drilling mud powder (AQUAGEL[3] from Baroid Drilling Fluids, Inc., of Houston, Tex.) containing bentonitic clay of the sodium montmorillonite variety. The resultant slurry was allowed to stand for about 12 hours to form a final hydrated gel having an approximate three gallon volume from which two gallons were used to mix the sealant composition. The mica was purchased as MICATEX[4] from Baroid Drilling Fluids, Inc., and included small mica flakes having effective particle diameters ranging up to about 1 mm.

[3]. AQUAGEL is a trademark of Baroid Drilling Fluids, Inc. of Houston, Tex.
[4]. MICATEX is a trademark of Baroid Drilling Fluids, Inc. of Houston, Tex.

The propylene glycol, free water, and potassium orthophosphate were purchased together as a commercially available mixture that is formed of 50% propylene glycol, about 47% water, and less than about 3% dipotassium orthophosphate by weight as a buffering agent. The glycol mixture was combined to substantial homogeneity with the prehydrated bentonite gel at an ambient temperature of about 75° F. and atmospheric pressure. The gel was first hydrated prior to being mixed with the propylene glycol, as is most preferable, because the addition of propylene glycol prior to hydration of the bentonite clay would impair the sealing performance of the final mixture by increasing viscosity, reducing gel strength, and reducing the level of clay platelet dispersion.

While the above tire sealant mixture can tolerate some ionic salts, e.g., the potassium orthophosphate, the addition of ionic salts to the mixture is undesirable due to flocculation of the clay platelets. Flocculation results in increased fluid loss through punctures and increased viscosity in the final mixture. While flocculated sealant mixtures will still function as tire sealants, these mixtures will not function in an optimal manner. Accordingly, it is preferred to maintain the total salt concentration in the final mixture at a minimal level. This minimal level is preferably less than about a 80,000 ppm sodium chloride equivalent, more preferably less than about 50,000 ppm, and most preferably less than about 30,000 ppm. The potassium orthophosphate is beneficial for its mixture buffering effect, but may optionally be eliminated from the preferred mixture. A dye or colorant may be added as an optional ingredient, and is preferably any water-soluble coloring agent, such as food coloring, and may be added in an effective amount for achieving a desired color.

The mica was stirred into the glycol and bentonite gel mixture. Settling of the mica and clay components was observed during storage of the mixture, but these were easily mixed again to a homogenized distribution throughout the composition by shaking of the mixture. The homogenized solution had an apparent viscosity of about 38 cp determined at 70° F. on a FANN VG meter at 300 rpm.

The mica and bentonite clay of Table 1 were added as filler materials to form a filter cake that serves to seal the flow of air upon puncturing of a pneumatic tire. This mixture of filler materials provided a combination of particle size distributions that produced particularly advantageous effects in the sealing of pneumatic tire punctures. The relative amounts of these ingredients may be varied up to about ±25% for purposes of producing effective sealant mixtures.

EXAMPLE 2

TIRE PUNCTURE TESTING

A mountain bicycle tire having a 5 cm width, a 26 inch diameter, and an approximate 270 cubic inch internal volume was selected for testing. A four ounce portion of the homogenous tire sealant mixture from Example 1 was introduced to the confines of the tire inner tube, in the manner depicted in FIGS. 1–3. After the valve core was replaced, the tire was repressurized to 50 psi. A nail having a 3mm diameter was driven flush into a one-inch thick board with a pointed two inch segment of the nail protruding through the board on the opposite side of the board from the flush nail head. The tire was positioned above the pointed nail segment for puncturing of the lowermost tire portion, and the nail was withdrawn from the punctured tire. No air leakage was observed, but a small 2mm diameter bead of liquid, which comprised sealant filtrate having most of the filler materials removed, could be observed at the exterior side of the puncture. The filtrate bead stopped growing at the approximate 2mm diameter size.

The pointed nail segment was used to puncture the tire a second time, except that the side of the tire was punctured while holding the board at a right angle with respect to the ground to puncture the tire at a nine o'clock position. In this case, the tire leaked while held in the original position, but sealed substantially instantaneously when the puncture was rotated downwardly towards the ground. The term "substantially instantaneously" is used here because a mist exited the puncture very briefly for a period of about a tenth of a second just prior to complete sealing of the puncture as the puncture rotated downward. Accordingly, in the sense of an observed internal tire pressure, no appreciable quantity of air escaped the tire.

These puncture tests were repeated ten times on the same tire, with the same sealing result in each case. At the end of the puncture testing, the tire with ten sealed holes was placed upon a bicycle and performed well on a five mile ride, i.e., the tire functioned without deflating or loosing an appreciable amount of internal tire pressure. The bicycle was parked, and the tire maintained a useful internal pressure for a period of about three months with no appreciable leakoff of pressure for an initial period of about two weeks. The gradual decline in sealant effectiveness derives from slow drying of the puncture-sealing filter cake, which may be restored by rotating the tire to redistribute the remaining internal tire moisture.

Figure 4:
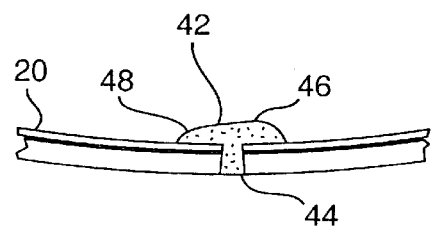
FIG. 4 depicts a sectional view of a sealing filter cake that has formed to prevent air leakage from a puncture through the wall of a bicycle inner tube.

A sealant-containing tire was punctured for sealing in a manner identical to that described above. The tire was deflated for removal of the inner tube, which was then cut open in the vicinity of a puncture site. As depicted in FIG. 4, an analysis of the puncture revealed the formation of a filter cake 42 proximal to puncture 44 in tube 20. The mica flakes 46 formed a large matrix over the interior of puncture 44, and the clay platelets 48 filled the voids in the matrix to completely seal puncture 44.

EXAMPLE 3

COMPARATIVE TESTING AGAINST OTHER SEALANT COMPOSITIONS

As previously indicated, a leading commercially available viscous fiber bicycle tire sealant has ingredients including propylene glycol, man-made fiber, 1% corrosion inhibitor, and 1% biocide. The commercial product was tested against the mixture derived from Example 1 by using the puncture test methods of Example 2. Table 2 serves to provide the comparative results, which demonstrate a clear superiority in the mixture from Example 1. The results were obtained over at least ten trials for each item on a given tire.

TABLE 2

COMPARATIVE TEST DATA

| Test Results | Example 1 Mixture | Commercial Mixture |
| --- | --- | --- |
| Recommended effective amount | 2–4 ounces | 4 ounces |
| Time to Seal | | |
| Pinhole | Instant | 2 minutes or longer |
| 3mm Nail | ⅔ revolution | FLAT - Ineffective |
| Pressure Loss | | |
| Pinhole | Negligible | Greater than 20 psi |
| 3mm Nail | 0–4 lbs @ 50 lbs | FLAT - Ineffective |
| Effective Pressure Range | up to 100 psi | 10–20 psi |
| Flexible Seal | Yes | Yes |
| Apparent Viscosity; FANN-VG meter @ 300 rpm, 70° F. | 38 cp ± 10 cp | 70 cp ± 10 cp |
| Valve Types Useful | Presta/Schrader | Schrader |
| Environmentally Harmful | No | No |

The pinhole punctures were obtained by using a conventional sewing pin to puncture the tire at the 9 o'clock position, removing the pin, and rotating the puncture downwardly for sealing. Similarly, the 3mm nail punctures were obtained using the nail and board from Example 2 to puncture the tire at the 9 o'clock position, and rotating the puncture downwardly to seal the puncture.

These comparative results demonstrate that the mixture of Example 1 has a significantly enhanced level of utility as compared to the commercially available product. It is significant that the higher viscosity commercial mixture permitted air to escape until the internal tire pressure fell to about 20 psi. In contrast, the Example 1 mixture was effective at sealing punctures even in the presence of up to 100 psi of internal tire pressure. Another significant aspect of these results is the fact that the commercial mixture typically clogged Presta valves and, therefore, is not a useful sealant in these types of tires. In contrast, the Example 1 mixture did not clog Presta valves. Furthermore, the Example 1 mixture served to seal the larger 3mm punctures with very little pressure loss, while the commercial mixture was ineffective against these large punctures. In terms of the effective volume of sealant mixture, it is further significant that a two ounce portion (0.007 ounces per cubic inch of tire space) of the Example 1 mixture served to seal punctures in an effective manner, whereas the four ounce recommended portion (0.015 ounces per cubic inch of tire space) of the commercial sealant was much less effective in terms of retaining pressurized air within the punctured tire. The correspondingly lesser required volume and weight of the sealant mixture from Example 1 is a significant reduction to bicycle racing enthusiasts who choose to utilize sealant compositions.

Those skilled in the art will understand that the preferred embodiments, as described hereinabove, may be subjected to apparent modifications without departing from the true scope and spirit of the present invention. Accordingly, the inventors hereby state their intention to rely upon the Doctrine of Equivalents to protect their full rights in the invention.

We claim:

1. A tire sealant mixture comprising:

bentonite in an amount ranging from about 0.2 to about 0.4 pounds of bentonite per gallon of said mixture;

a water-miscible polyhydric alcohol in an amount ranging from about 0.15 to about 0.4 gallons of said polyhydric alcohol per gallon of said mixture;

mineral flakes in an amount ranging from about 0.5 to about 0.9 pounds of said mineral flakes per gallon of said mixture;

and water.

2. The mixture as set forth in claim 1, said composition having an apparent viscosity from 0 to about 50 centipoise as determined using a FANN-VG meter at 300 rpm and 70° F.

3. The mixture as set forth in claim 1, wherein said polyhydric alcohol is a glycol having a carbon number ranging from two to seven.

4. The mixture as set forth in claim 3, said glycol being propylene glycol.

5. The mixture as set forth in claim 1, said water being present in an effective amount for permitting said mixture to retain at least about 50 psi of internal pressure within a tire after sealing a puncture in said tire cause by a puncturing object having a diameter of at least up to 3 mm.

6. In a tire sealant mixture having water, clay, glycol, and mica, the improvement comprising said mixture having an apparent viscosity of less than about 70 centipoise as determined from said mixture in a substantially homogenous state at 70° F. using a FANN-VG meter at 300 rpm.

* * * * *